March 25, 1941.  H. A. GEHRES  2,236,401

PISTON OIL COOLING SYSTEM

Filed Jan. 20, 1940  2 Sheets-Sheet 1

INVENTOR.
HEWITT A. GEHRES.
BY
ATTORNEYS

March 25, 1941. H. A. GEHRES 2,236,401
PISTON OIL COOLING SYSTEM
Filed Jan. 20, 1940 2 Sheets-Sheet 2
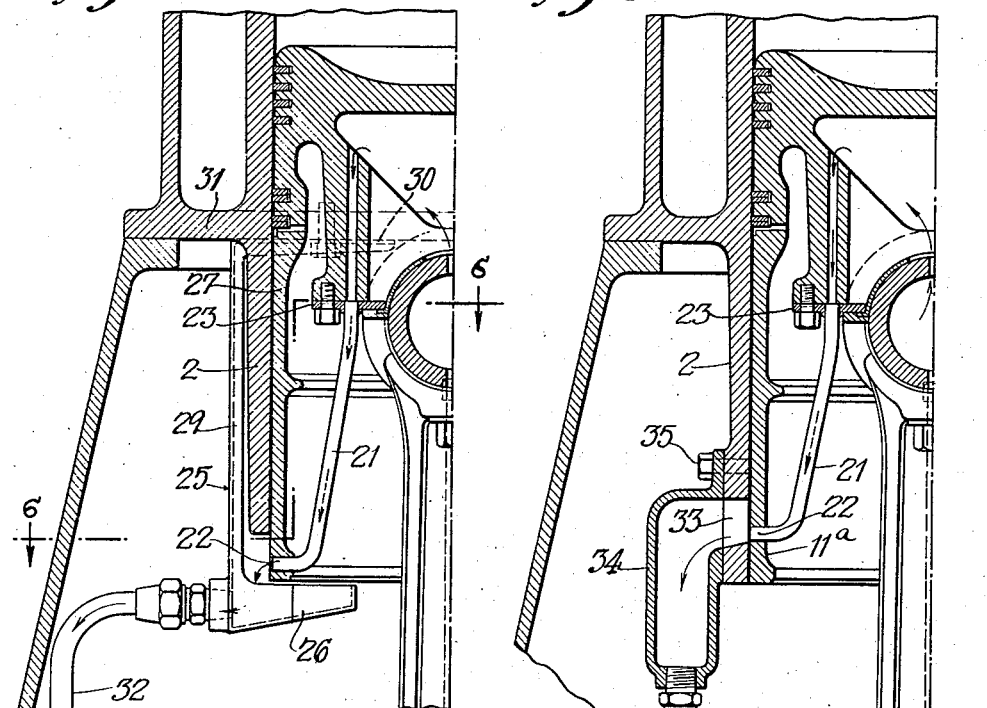
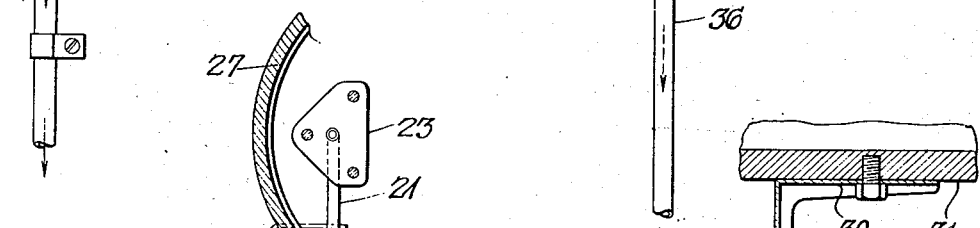
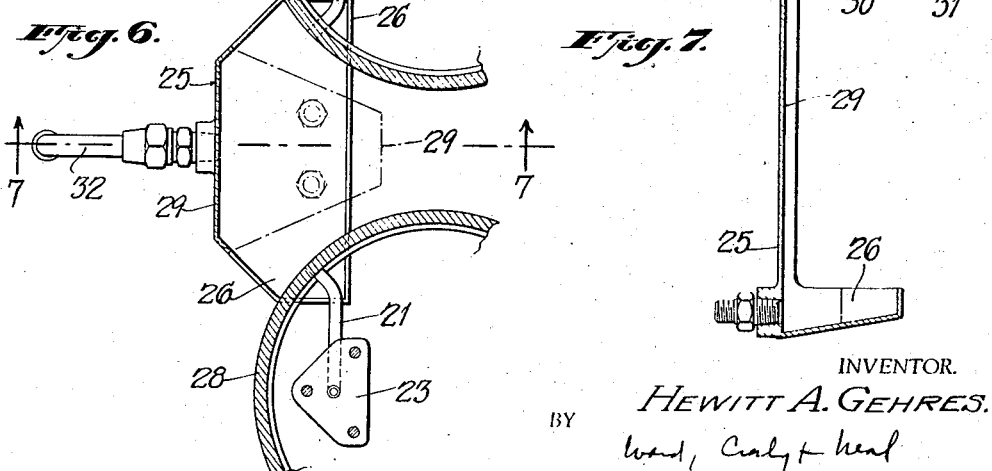
INVENTOR.
HEWITT A. GEHRES.
BY
ATTORNEYS Patented Mar. 25, 1941

2,236,401

UNITED STATES PATENT OFFICE 2,236,401

PISTON OIL COOLING SYSTEM

Hewitt A. Gehres, Mount Vernon, Ohio, assignor to Cooper-Bessemer Corporation, Mount Vernon, Ohio, a corporation of Ohio Application January 20, 1940, Serial No. 314,753

5 Claims. (Cl. 123—176)

This invention pertains to improvements in cooling and lubricating systems for reciprocating engines, particularly internal combustion engines, and its principal object is to provide a novel construction and arrangement for circulating a cooling liquid, such os oil, through the pistons and other reciprocating parts, such as the connecting rods, etc.

According to the invention, the piston head is provided with a closed cavity through which the cooling liquid is circulated by way of inlet and outlet passages. The inlet passage extends through peripheral grooves in the main and connecting rod bearings of the crankshaft and through ducts in the crankshaft and connecting rod communicating therewith and with the piston cavity, whereby oil supplied under pressure to the main bearing grooves is fed to the piston cavity without the use of slip tubes, grasshopper motions, etc.

The outlet passage extends, in accordance with a feature of the invention, from the piston cavity through a suitable duct provided in the piston and out through the side wall of the piston near its base, thereby to provide an opening at the base of the piston surface which engages the cylinder wall. During the greater portion of the piston stroke, this outlet passage is therefore closed by engagement of the piston with the cylinder wall, but the cylinder wall is so arranged as to expose the outlet at the end of the outward stroke, whereby the pressure continuously applied to the inlet passage forces a charge of oil through the cavity and ejects it from the outlet for a fraction of each outward stroke. In a four cycle engine, the outward stroke may be either an expansion or suction stroke, but will be referred to hereinafter for simplicity as the "expansion stroke." Either of two arrangements may be employed for thus exposing the cavity outlet each piston stroke. According to one modification, the cylinder wall may be cut away at its base or so terminated that the piston base projects slightly beyond the cylinder at the end of the expansion stroke thereby to expose the cavity outlet. Or, alternatively, the cylinder wall may be provided near its base with a relatively large passage or opening which registers with the cavity outlet at the end of the expansion stroke. Either arrangement permits circulation of the cooling liquid through the cavity for an interval during each stroke.

Of course, the oil thus ejected might be permitted to splash and drain directly into the crankcase, but this is objectionable because of the resulting relatively high oil consumption. In accordance with a distinctive feature of the invention, this objectionable arrangement is eliminated by providing a drain box at the point where the cavity outlet is exposed, the drain box being positioned to receive the oil ejected and to drain it off directly to the sump through an interconnecting pipeline. In the modification wherein the piston base projects beyond the cylinder wall on the expansion stroke, the drain box takes the form of an open receptacle or trough fitted closely against the cylinder wall and extending with very small clearance around and beneath the piston at the end of the expansion stroke. Due to the fact that the cavity outlet extends in a radial direction through the piston wall, the oil ejected therefrom is directed into the trough toward the drain pipe so that practically no splashing into the crankcase occurs. In the modification wherein the cylinder wall is provided with a passage registering with the piston cavity outlet, the drain box may be bolted to the cylinder wall in direct communication with this passage, thereby completely eliminating possibility of the oil being discharged into the crankcase.

The constructions described have been found in practical operation to provide a distinct improvement over prior constructions, according to which latter the cavity outlet does not extend through the cylindrical side wall of the piston, but opens downward within its interior. As a consequence, the oil spills out continuously during both the expansion and compression strokes, so that it is impossible to prevent excessive splashing into the crankcase even though a drain box is positioned to catch the oil. This splashing results, as stated, in excessively high oil consumption. As against this and with the improved construction described herein, no oil flows during the major portion of the piston stroke owing to engagement of the cavity outlet with the cylinder wall, the flow being permitted only at the end of the expansion stroke when the cavity outlet is positioned close to the drain box, so that splashing is substantially eliminated even in the open construction, and is completely eliminated with the closed construction above described.

Figure 1:
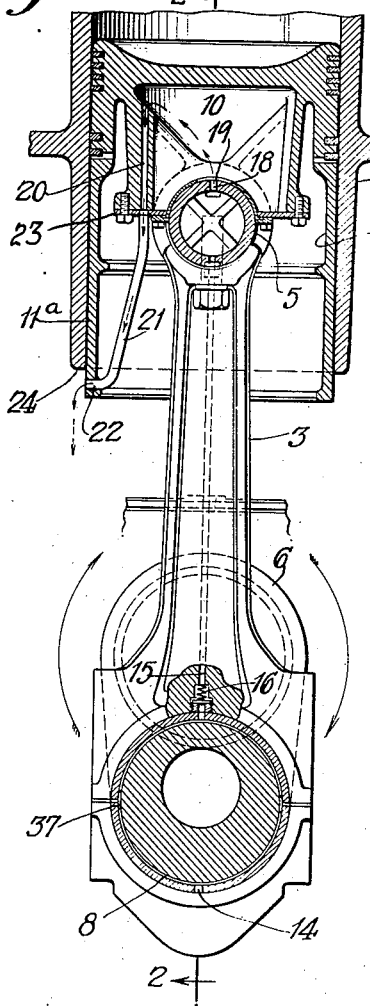
Fig. 1 is an axial section, transverse to the crankshaft, through a piston and connecting rod assembly in accordance with a modification of the invention wherein the piston base projects below the cylinder wall at the end of the expansion stroke.

Fig. 5 is an enlarged sectional detail corresponding to the upper left hand portion of Fig. 1, but including in the assembly the open type drain box construction above referred to; Fig. 6 is a section at 6—6 of Fig. 5 showing the manner in which one drain box is arranged to serve a pair of adjacent pistons; and Fig. 7 is a sectional detail at 7—7 of Fig. 6 showing the mounting of the drain box on the cylinder block.

Fig. 8 is a sectional view similar to Fig. 5, but illustrative of the construction wherein the cylinder wall is provided with a passage registering with the piston cavity outlet on the expansion stroke, and opening into a drain box bolted to the cylinder wall.

Referring to the construction of Figs. 1 to 4 inc., a piston 1 which slidably engages a cylinder wall 2, is reciprocated by means of a connecting rod 3 articulated thereto by wrist pin 5. The connecting rod is actuated by a crankshaft 6, journaled through main and crankshaft bearings 7, 7 and 8.

The piston head is provided with a closed cavity 10 through which a cooling liquid, such as oil, is circulated. For providing an inlet passage to cavity 10, the main crankshaft bearings 7, 7 are provided with peripheral grooves 11, 11, into which oil is fed under pressure by means not shown, through the axially drilled main bearing caps 12, 12. The crankshaft is provided with interior ducts 13, 13 extending from the main bearing grooves 11, 11, to a similar groove 14 provided in the crankshaft bearing 8. Groove 14 communicates with a duct 15 extending axially through the connecting rod. As shown more in detail in Fig. 3, duct 15 contains a spring-controlled, pressure release valve 16 for maintaining a constant oil pressure on the oil supply side of the valve. The crankshaft groove 15 opens into a chamber 17 in the wrist pin 5, from which the oil passes into the piston cavity 10 through pin slots 18 in the wrist pin, and through arcuate slots 19 in the wrist pin bushing. As shown in Fig. 1, the arcuate slots 19 are of sufficient peripheral length to register with the wrist pin slots 18 for all positions of articulation thereof with respect to the bushing.

An outlet passage for the piston cavity 10 extends through a duct 20 in the piston head and thence through a tube 21 connecting therewith, the tube passing in turn through the piston side wall at its base 11a, whereby the outlet opens at 22 at the base of the piston surface which slidably engages the cylinder wall 2. The upper end of tube 21 is brazed to a plate 23 bolted to the piston head as shown, while the lower end is brazed to the piston wall.

Figure 2:
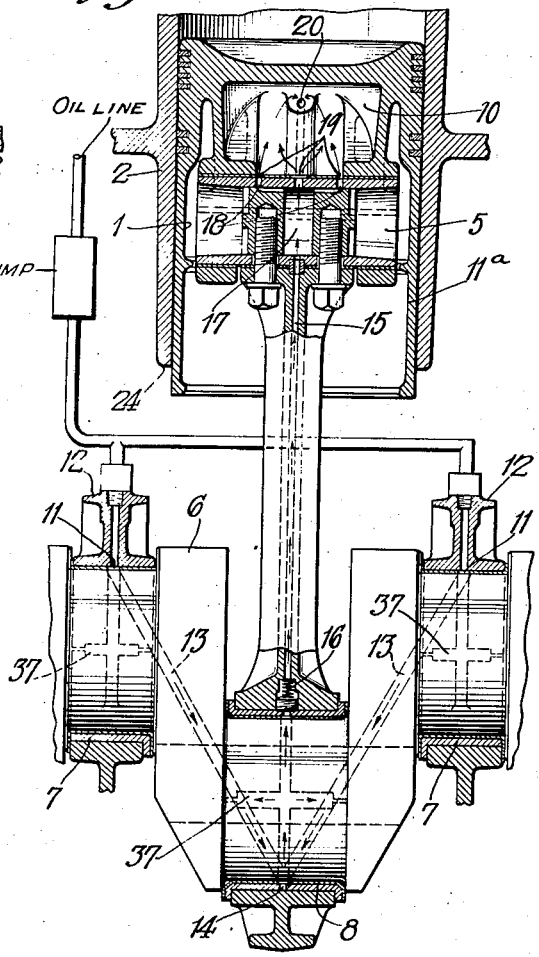
Fig. 2 is a section at 2—2 of Fig. 1 illustrating the mode of feeding oil to the piston cavity through peripheral grooves in the main and connecting rod crankshaft bearings and through ducts communicating therewith provided in the crankshaft and connecting rod.
Figure 3:
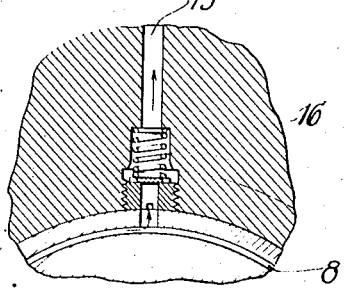
Figs. 3 and 4 are enlarged sectional details of the Figs. 1 and 2 assembly, Fig. 3 illustrating the oil passage construction between the connecting rod and crankshaft, and Fig. 4 showing the cavity outlet through the piston wall.
Figure 4:
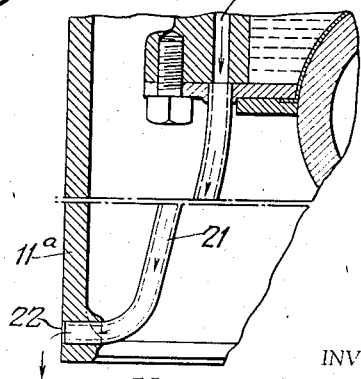

As shown in Figs. 1 and 2, the cylinder wall is so proportioned in relation to the piston and the piston stroke, that as the piston approaches the end of the expansion stroke, the piston base projects sufficiently beyond the lower edge 24 of the cylinder wall to expose the cavity outlet 22. At all other positions of the piston, however, outlet 22 will be closed due to engagement thereof with the cylinder wall 2.

In the operation of this system, oil applied under pressure to the passages in the main crankshaft bearing caps 12, will fill the crankshaft main bearing grooves 11 and flow thence through the crankshaft ducts 13 and into the connecting rod bearing groove 14, and thence into the crankshaft duct 15 through the constant pressure valve 16. From duct 15, the flow will continue into the wrist pin chamber 17 and thence through slots 18 and 19 into the piston cavity 10, thus filling the cavity with oil under pressure during the interval that outlet 22 is closed. When pressure equilibrium is reached, valve 16 will close. As the piston approaches the end of its expansion stroke, however, to expose outlet 22 below the cylinder wall, valve 16 will open due to release of pressure in cavity 10, and a charge of oil will be forced through the system including cavity 10 to be discharged at outlet 22. This discharge results from the combined pressure of the oil supply and the inertia force on the column of oil in the outlet passages 20, 21, which force is a maximum at the end of the expansion stroke.

With the construction as shown in Fig. 1, the oil thus discharged would splash down into the crankcase. Referring now to Figs. 5 and 6, this is prevented in accordance with one modification of the invention by addition of a drain box 25 which fits very closely about the lower portion of the cylinder wall 2 as shown. The drain box comprises a pan or trough 26 extending beneath the piston below the outlet 22 with just sufficient clearance to prevent contact with the piston at the end of the expansion stroke. As shown in Fig. 6, the pan 26 is of sufficient width to receive the oil from the outlets of a pair of adjacent cylinders 27, 28. The pan 26 is provided with a vertical extension 29 which is bent at right angles at the top to provide a horizontally extending support 30 which is bolted to the bottom of the cylinder block 31, as shown in Fig. 7. The oil discharged at outlet 22 into pan 26 is drained away to the sump through a pipeline 32 connected to the drain box as shown. Due to the fact that the outlet 22 is directed toward the rear of the drain box and the fact that the latter fits closely about the cylinder wall with but slight clearance below the piston on the expansion stroke, and the further fact that oil is discharged only when this piston is near the bottom of its expansion stroke as shown, the possibility of oil splashing into the crankcase is substantially eliminated. This possibility is further minimized by the downward slope to the drain pipe imparted to the bottom of pan 26.

In the construction shown in Fig. 8, this contingency is completely eliminated by constructing the cylinder wall 2 to be coextensive with the piston base 11a at the bottom of its expansion stroke, and by providing a relatively large passage 33 through the cylinder wall which registers with the piston cavity outlet 22 at the bottom of the expansion stroke. Passage 33 is arranged to open into a drain box 34 which is bolted to the cylinder wall at 35 as shown, the drain box in turn draining into a pipeline 36 extending to the sump. With this construction, the oil discharged at the piston outlet 22 must of necessity flow directly through passage 33 into the drain box 34 and thence to the sump over pipe 36, so that no oil can pass into the crankcase. As shown in the drawings, passage 33 in the cylinder wall is so proportioned in relation to the base of the piston below the outlet 22, that this portion of the piston covers passage 33 during the piston compression stroke.

The outlet constructions above described represent a decided advance, in that they eliminate splashing into the crankcase as well as the attempted avoidance thereof by use of telescopic tubes, etc., which devices usually shake loose and cause trouble. It will be apparent that the outlet tube 21 will not shake loose due to its being securely fastened at both ends, whereas such is not the case with a telescopic tube fastened only at its upper end.

Referring to Fig. 2, the slots and grooves 11, 13, 14 also serve to lubricate the crankshaft bearings, additional slots 37 communicating therewith serving to lubricate the bearing thrust areas.

I claim:

1. In a reciprocating engine in combination: a piston slidably engaging a cylinder wall, means for reciprocating the piston including a connecting rod articulated thereto, the head of said piston containing a closed cavity, and means for circulating cooling liquid through said cavity including, an inlet passage extending thereto through a bore in said connecting rod, and an outlet passage extending therefrom and through the base of the piston wall engaging the cylinder wall, drainage means including a drain box positioned at the base of said cylinder wall, and said cylinder wall being arranged to expose said outlet passage to said drain box during the piston expansion stroke.

2. In a reciprocating engine in combination: a piston slidably engaging a cylinder wall, means for reciprocating the piston including a connecting rod articulated thereto, the head of said piston containing a closed cavity, and means for circulating cooling liquid through said cavity including, an inlet passage extending thereto through a bore in said connecting rod, and an outlet passage extending therefrom and through the base of the piston wall engaging the cylinder wall, drainage means including a drain box positioned at the base of said cylinder wall, and said piston being arranged to project beyond said cylinder wall during the piston expansion stroke for exposing said outlet passage to said drain box.

3. In a reciprocating engine in combination: a piston slidably engaging a cylinder wall, means for reciprocating the piston including a connecting rod articulated thereto, the head of said piston containing a closed cavity, and means for circulating cooling liquid through said cavity including, an inlet passage extending thereto through a bore in said connecting rod, and an outlet passage extending therefrom through the base of the piston wall engaging the cylinder wall, drainage means including a drain box secured to said cylinder wall at its base, and said cylinder wall containing a passage therethrough into said drain box, said passage registering with said piston outlet passage during the piston expansion stroke.

4. In a reciprocating engine in combination: a piston slidably engaging a cylinder wall, means for reciprocating the piston including a connecting rod articulated thereto, the head of said piston containing a closed cavity, and means for circulating cooling liquid through said cavity including, an inlet passage extending thereto through a bore in said connecting rod, and an outlet passage extending therefrom through the base of the piston wall engaging the cylinder wall, means for supplying said liquid under pressure to said inlet passage, drainage means including a drain box positioned at the base of said cylinder wall, and said cylinder wall being arranged to expose said outlet passage to said drain box during the piston expansion stroke.

5. In a reciprocating engine in combination: a piston slidably engaging a cylinder wall, the head of said piston containing a closed cavity, means for reciprocating the piston including a connecting rod and crankshaft, the latter journaled through main and connecting rod bearings, and means for circulating cooling liquid through said cavity comprising, an inlet passage extending thereto through peripheral grooves in said bearings and through ducts in said crankshaft and connecting rod communicating therewith and with said cavity, and an outlet passage extending from said cavity through the base of the piston wall engaging the cylinder wall, means for supplying cooling liquid under pressure to said main bearing grooves, drainage means including a drain box positioned at the base of said cylinder wall, and said cylinder wall being arranged to expose said outlet passage to said drain box during the piston expansion stroke.

HEWITT A. GEHRES.